Patented Nov. 21, 1944

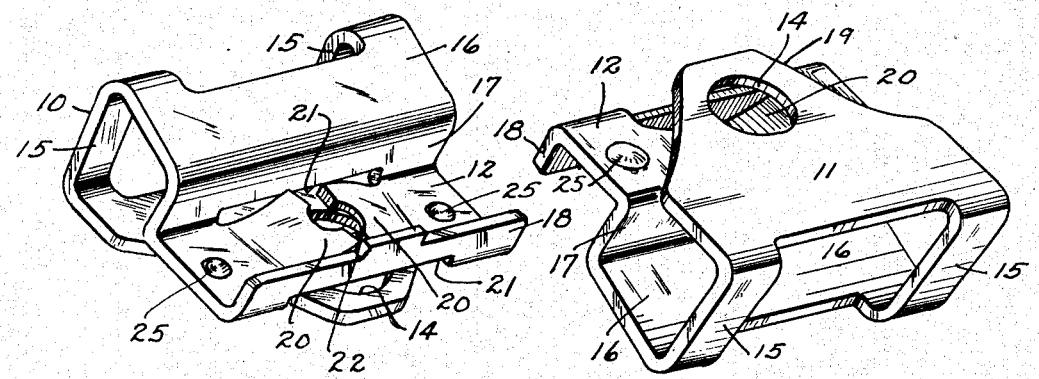
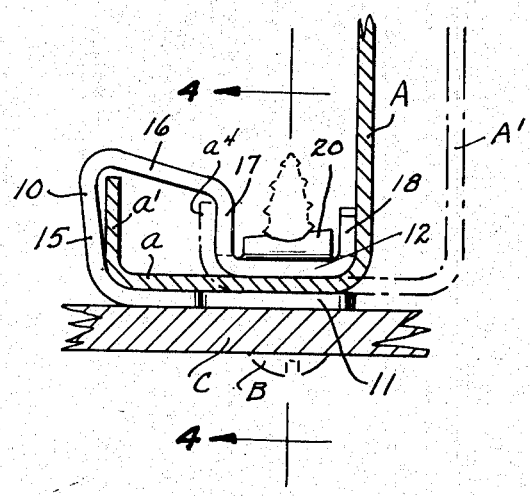
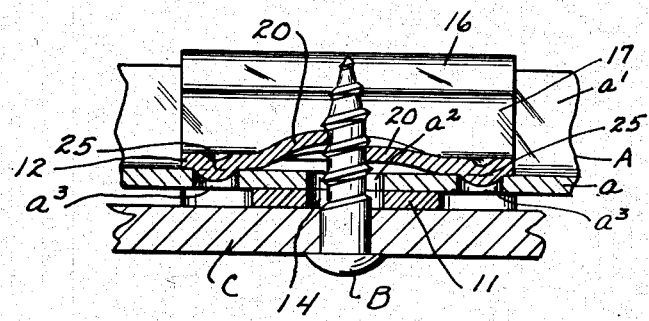

2,363,210

UNITED STATES PATENT OFFICE 2,363,210

FASTENING DEVICE

George A. Tinnerman, Cleveland, Ohio, assignor to Tinnerman Products, Inc., Cleveland, Ohio, a corporation of Ohio Application October 12, 1943, Serial No. 505,951

7 Claims. (Cl. 85—36)

This invention relates to a fastener adapted for securing together two members one of which has a projecting edge, flange, or a bead. For instance, flanged structural members occur frequently in airplane construction and it is very desirable to have ready means for securing a panel, instrument or other device directly to such member. In other instances it may be desired to secure quickly a flanged article to a support.

In any of such cases my fastening device is arranged to embrace the flanged member and hold itself in position thereon while providing a retaining device, preferably a nut for a threaded bolt, to secure the two members.

My fastening device is made of a single strip of resilient sheet material, preferably spring steel, suitably cut and bent on itself to provide two portions to extend around an edge, flange or projection and engage opposite faces of such member, one of such portions being provided with an opening for the passage of a stud and with deformed members adapted to engage the stud. These deformed members are preferably a pair of opposed tongues partially severed from that region of the member and bent at opposed angles thereto and warped in opposite directions so that the ends of the tongues suitably notched define a helical turn corresponding to the thread of a bolt to be used as a fastener.

My fastener is hereinafter more fully explained in connection with the description of the preferred embodiment illustrated in the drawing hereof.

In the drawing, Fig. 1 is a perspective of the fastener looking down at one face thereof, which it is convenient to call the top; Fig. 2 is a perspective looking at the opposite face of the fastener, which in the drawing is the bottom; Fig. 3 is an end view of the fastener, in place on a structural beam shown in section, and carrying a suitable panel; Fig. 4 is a cross section of the parts shown in Fig. 3, in a plane indicated by the line 4—4 on Fig. 3.

In Figs. 3 and 4, I have shown at A a suitable structural beam having a flange $a$ with an edge rib or flange $a'$. My fastener, designated 10, is designed to extend about the rib $a'$ and engage opposite spaces of the portion on $a$. Thus, as shown in Fig. 3, the fastener provides a flat bottom portion 11 bearing against the outer face of the web $a$ and a top portion 12 bearing against the inner face. Each portion has a bolt opening, and the portion 12 is formed with a thread engager about the bolt opening.

A screw bolt B is indicated as passing through a panel C and then through the web $a$ of the beam and then through the member 12 of the fastener and finding its nut in the thread engager of the fastener, as hereinafter more fully described.

The portion 11 of my fastener is preferably a flat plate having an opening 14 for the passage of the bolt as shown in Fig. 2. Leading from the outer edge of this portion 11 are two strap like parts 15, made narrow and spaced apart for lightness, and these straps at their other ends joint another plate-like portion 16 which is bent downwardly as at 17 then outwardly into the portion 12 above-mentioned, and finally flanged upwardly at the extreme edge as shown at 18.

The flat portion 12 carries the thread engager, which is shown as comprising the pair of tongues 20 partially severed from such flat portions by slits 21 along their longitudinal edges and an opening 22 between them, these tongues being then bent up at an acute angle to the plane of the member 12 to act as struts engaging the part passing through the opening 22. Preferably the tongues are notched at their ends and are warped in opposite directions so that their combined edges present one turn of a helix corresponding to the threads of the bolt B to be used with the fastener. The upright portions 17 and 18 of the fastener make effective bridges, tying together the anchorages of the two tongues 20.

Such fastener as described may be sprung into place by being shifted over the flange $a'$ of the supporting member, or it may be shoved into place lengthwise of the member. When it is in position, so that the bolt openings of the fastener register with the bolt openings of the supporting web and panel; a bolt may be passed through all of the parts.

To prevent shifting of the fastener on the supporting beam, before the screw is applied, I prefer to provide a pair of projections on the under face of the layer 12 of the fastener. These are shown in Figs. 1 and 4 as made by indentations made in the upper face of such region, causing downward projections 25 which are adapted to seat in openings $a^3$ (Fig. 4) in the web of the supporting beam.

It will be seen that with a supporting or attached member A, having openings properly spaced in its web, a number of these fasteners may be slipped into position in proper place over the edge flange or bead and engage snugly the faces of the web, and when positioned in registration with the bolt openings in the web will hold themselves in such position so that they are ready to receive the bolts whenever applied. After the web has been so provided with these fasteners it is ready for immediate attachment of the panel C, or other device, by the mere act of turning in the screws B through the panel into nuts provided by the fasteners.

It will be noted from the drawing that there is considerable space between the plate-like bottom portion 11 of the fastener and the top arm 16, and considerable space between the trap portion 15 and the downturned flange 17 of the fastener. This leaves a comparatively large free space bounded by the fastener portions and in this space may readily be the flanges, beads, or ribs of members of various sizes, positions and shapes. Fig. 4, for example, shows in full lines one size and shape and position of flange a' which is readily received in my fastener. The view also shows in broken lines a narrower flange $a^4$ having a different position in this space and represented as an edge flange of a different beam A' shown in broken lines.

It will be seen that my fastener provides a plurality of reaches to engage the rib on the bead and thereby position the fastener laterally. Thus, as shown in Fig. 3, the connecting portion 15 engages the rib a', whereas in broken lines the portion 17 engages the rib $a^4$. Also in full lines the final flange 18 of the fastener engages the web A, whereas that is not the case in the form shown in broken lines. Thus a lateral engagement may result at any or all of these surfaces; that is to say, any of the members extending approximately right to the flat base 11 are available for engaging formations which project from the web 11.

The open space of the fastener could also receive a bead of considerable size on a beam, such, for instance, as is present on a deck beam, or various other structural shapes. While I have shown the fastener as mounted on a flanged structural member for supporting an attached panel, the situation might be reversed and the structural member flat and the fastener used to secure a suitably flanged instrument, and there are other uses for the fastener, which will be readily apparent.

I claim:

1. A fastener adapted to embrace a member having an edge rib comprising a strip of resilient material bent to provide the following regions connected in series; first, a region to engage the face of the member; second, a region extending entirely on one side of the first region to project beyond the rib; third, a substantially flat region inclining toward the first region to extend across the edge of the rib; fourth, a region to extend toward the first region; and, fifth, a region substantially parallel with the first region, the first and fifth regions having registering bolt openings through them and one of them being deformed about the opening to provide a bolt-engager.

2. A fastener made of a single strip of resilient sheet material and having five successive regions, each at an angle to each adjacent region, namely, first, a flat region; second, a region approximately at right angles thereto; third, a region extending over the first region; fourth, a region extending toward the first region; fifth, a region substantially parallel to the first region, the first and fifth regions having registering bolt-openings and the fifth region being deformed about the opening to provide a thread engager.

3. A fastener made of a single strip of resilient sheet material and having six successive regions, each at an angle to each adjacent region, namely, first, a flat region; second, a region approximately at right angles thereto; third, a region inclining from the end of the second region toward the first region; fourth, a region at approximately right angles to the first region; fifth, a region substantially parallel to the first region, and, sixth, a region at substantially right angles to the fifth region the first and fifth regions having registering bolt openings and the fifth region being deformed about the opening to provide a thread engager.

4. A fastener comprising a single strip of resilient sheet material bent on itself to provide two substantially parallel regions adapted to engage opposite faces of a member to be embraced, said two regions being connected by an integral loop adapted to extend about a flange or rib on said member, said substantially parallel regions having registering bolt openings and one of them on opposite sides of its opening having a pair of inclined opposed tongues partially severed from said region and bent at acute angles thereto and spaced at their ends to provide means to engage a bolt passing through the registering openings, the region carrying the tongues having beyond the roots of the tongues projections to engage openings in the member embraced.

5. A fastener made of a single strip of resilient sheet material bent into six regions, each at an angle to the adjacent region as follows: namely, first, a flat region; second, an upstanding region; third, a return region inclining toward the flat region; fourth, a region substantially at right angles to the flat region; fifth, a region substantially parallel with the flat region; sixth, a region substantially parallel with the fourth region, the first and fifth regions being provided with registering bolt openings and the fifth region having a pair of oblique tongues extending longitudinally of the fifth region, and partially severed therefrom but attached thereto in the vicinity of the edges of the fifth region, said tongues being notched at their free ends and warped to define a helical turn, and a pair of indentations in the fifth region respectively beyond the root of a tongue and nearer the adjacent end of the region, which indentations produce projections on the underside of said fifth region.

6. A fastener substantially as shown, made of a single strip of resilient sheet material bent into six regions, each at an angle to the adjacent region as follows: namely, first, a region having a narrowed portion with a bolt opening; second, an upstanding region comprising two spaced straps; third, a return region inclining toward the first region; fourth, a region substantially at right angles to the first region; fifth, a region substantially parallel with the first region; sixth, a region substantially parallel with the fourth region, the fifth region having a pair of oblique tongues extending longitudinally of the fifth region, and partially severed therefrom but attached thereto intermediate the edges of the fifth region, said tongues being notched at their free ends and warped to define a helical turn, and a pair of indentations in the fifth region respectively between the root of a tongue and the adjacent end of the region which indentations produce projections on the underside of said fifth region, the narrow portion of the first region clearing said projections, the lines of fold at the junctions of the fourth and fifth regions and of the fifth and sixth regions respectively being substantially coincident with the slits defining the edges of the tongues.

7. A fastening device comprising a strip of resilient sheet material bent on itself to provide two substantially parallel regions adapted to engage opposite faces of a member and having registering bolt receiving openings, one of said regions having a pair of opposed tongues partially severed from said region on opposite sides of its bolt opening by parallel slits extending along opposite edges of the tongues, said tongues extending upwardly in oppositely inclined directions and their ends cooperating to provide a bolt engager, said strip having upstanding regions on opposite sides of the tongues bent at said slits upwardly from the region carrying the tongues and forming bridges between the two tongue anchorages, and a loop connecting one of said bridges with the other substantially parallel region mentioned.

GEORGE A. TINNERMAN.